Oct. 13, 1953   J. W. LITTLE   2,655,265
CONTINUOUS ROTARY PRESSURE OR VACUUM FILTER
Filed Jan. 31, 1949   6 Sheets-Sheet 1

INVENTOR.
JOHN W. LITTLE
BY
Jennings & Carter
ATTORNEYS

Oct. 13, 1953 J. W. LITTLE 2,655,265
CONTINUOUS ROTARY PRESSURE OR VACUUM FILTER
Filed Jan. 31, 1949 6 Sheets-Sheet 2
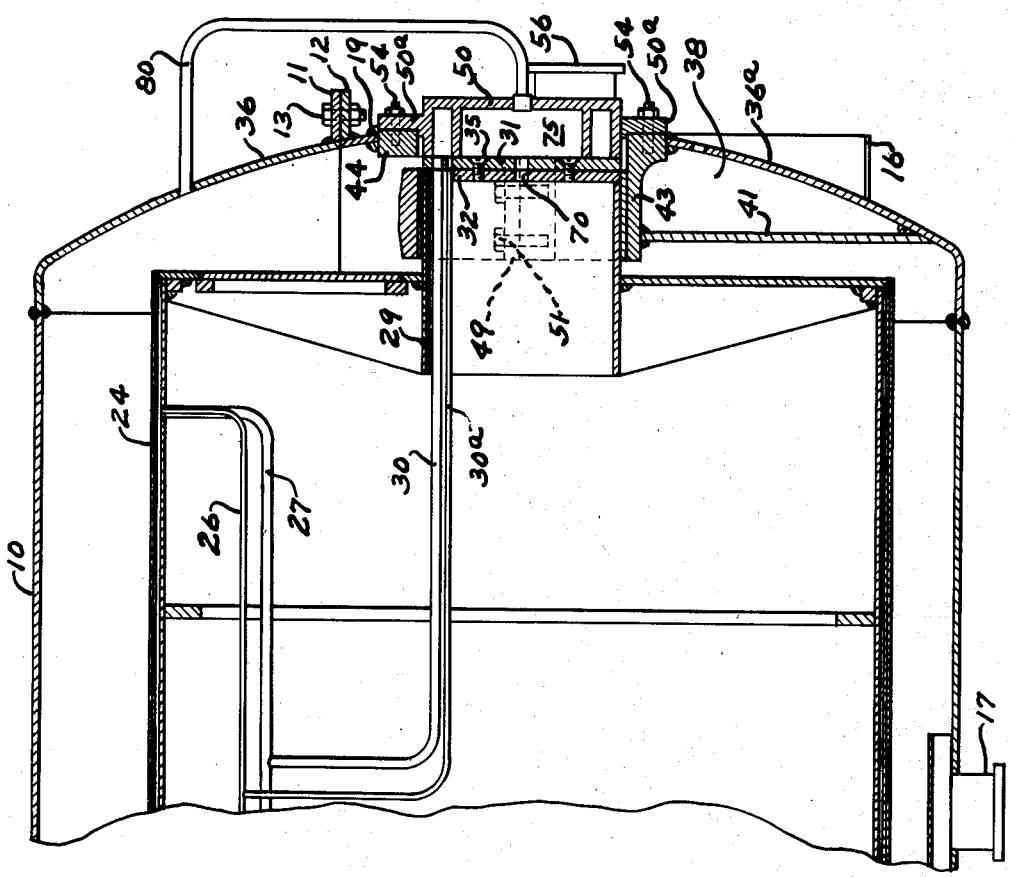
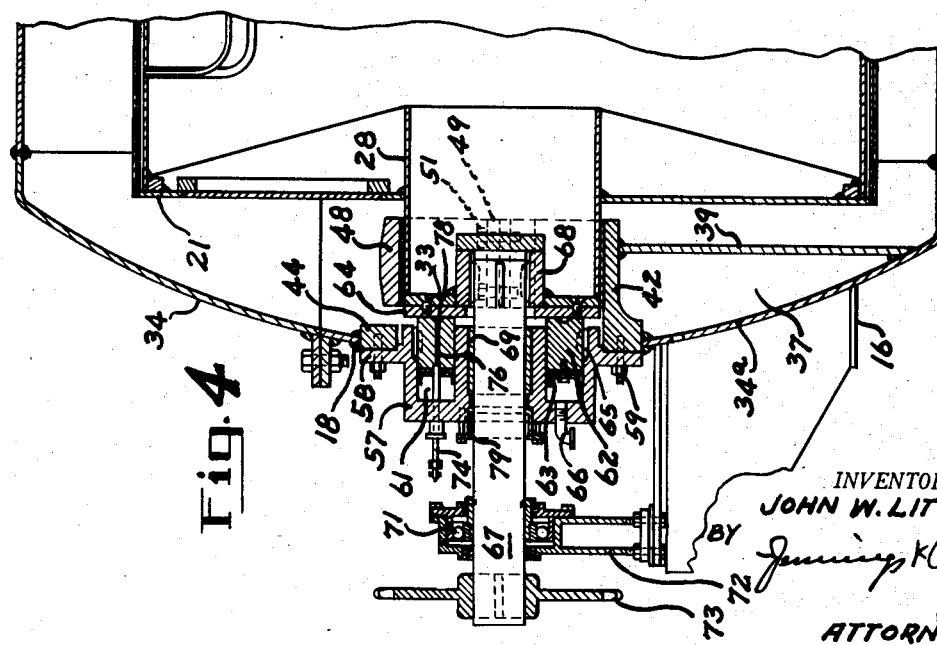
Fig. 4
INVENTOR.
JOHN W. LITTLE
BY
ATTORNEYS Oct. 13, 1953 J. W. LITTLE 2,655,265
CONTINUOUS ROTARY PRESSURE OR VACUUM FILTER
Filed Jan. 31, 1949 6 Sheets-Sheet 3

INVENTOR.
JOHN W. LITTLE
BY
Jennings & Carter
ATTORNEYS

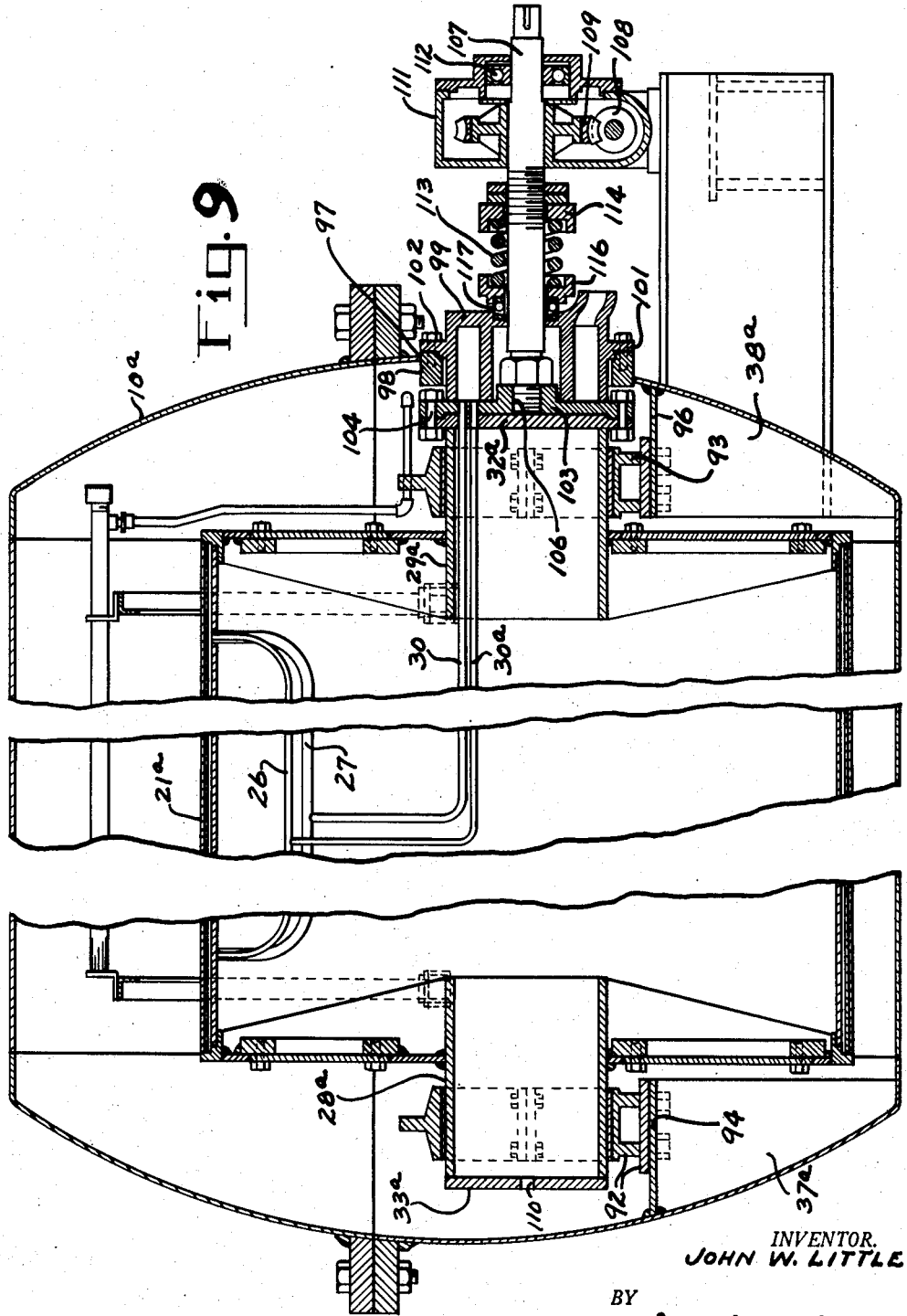

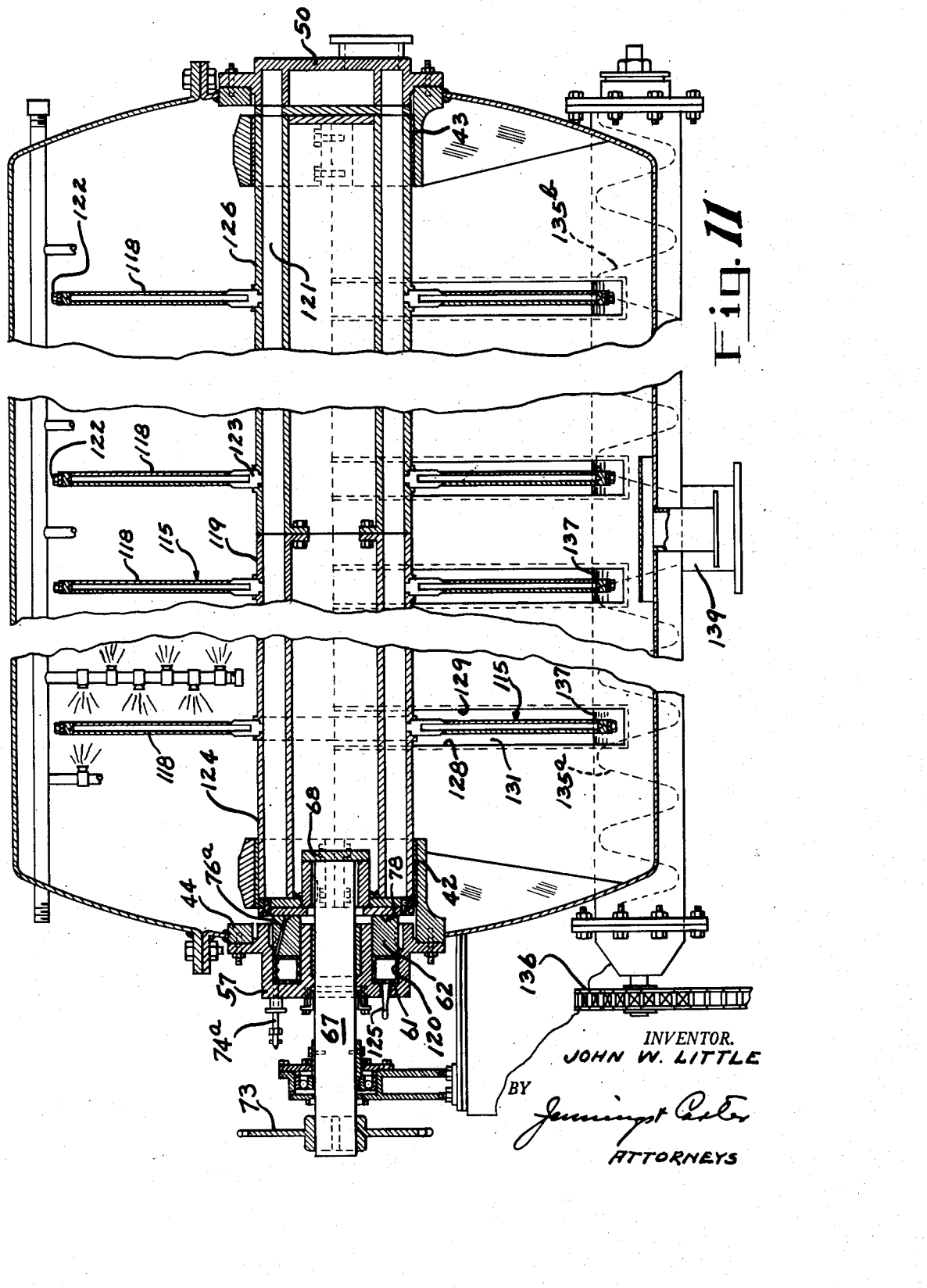

Patented Oct. 13, 1953

2,655,265

UNITED STATES PATENT OFFICE 2,655,265

CONTINUOUS ROTARY PRESSURE OR VACUUM FILTER

John W. Little, Birmingham, Ala., assignor to Goslin-Birmingham Manufacturing Company, Inc., a corporation of Alabama Application January 31, 1949, Serial No. 73,688

9 Claims. (Cl. 210—200)

This application is a continuation-in-part of my previously filed application, Serial No. 67,971, filed December 29, 1948, now abandoned, relating to Continuous Rotary Filter.

This invention relates to continuous rotary filters, such as drum or rotary disc type filters, and has for its object the provision of an improved mounting for the rotary filter assembly whereby stuffing boxes are eliminated and the bearings for the trunnions of the assembly are anchored within the filter casing and are so designed as to permit ready removal and replacement of the filter assembly and renewal of the bearings.

A further object of my invention is to provide a continuous rotary filter with the rotary filter assembly and the filtrate valve located within the filter casing, whereby the provision and maintenance of stuffing boxes between the trunnions and the filter casing are eliminated.

Another object of the invention is to provide a continuous rotary filter with the rotary filter assembly and the filtrate valve inside the filter casing whereby the provision of stuffing boxes in the filtrate valve outside the filter casing is eliminated.

Another object of the invention is to provide means for maintaining the filter assembly in substantially leakproof contact with the filtrate valve inside the filter casing.

A still further object of my invention is to provide a continuous rotary filter of the drum or leaf type which shall embody a closed cylindrical casing, having the rotary filter assembly mounted wholly within the casing and with improved cake discharge means, whereby the filter may be employed either as a pressure or a vacuum type filter.

Various other objects and advantages of my invention will appear as this description proceeds.

As is well known in the art to which my invention relates, continuous rotary filters, usually embody a casing in which the rotary filter assembly is mounted. The filter assembly may be either in the form of a drum with segmental compartments extending longitudinally of the drum or with discs extending radially of the assembly. In either instance, the assembly is provided with trunnions which normally extend out through the ends of the casing and through which the filtrate is withdrawn by means of a filtrate valve bearing against the outer end of one of the trunnions. Where a pressure differential is maintained between the inside and the outside of the filter casing, it is usually necessary to provide stuffing boxes between the trunnions and the casing wall which greatly add to the frictional load on the assembly and which are difficult to maintain fluidtight. Where gases other than air are present within the casing, leakage around the stuffing boxes may result in loss of valuable products as well as to create health and explosion hazards.

With the prior art construction also, it has been necessary to support the filtrate valve adjacent the end of the trunnion from which it receives the filtrate and to hold it against turning with the trunnion while pressing it firmly against the trunnion to prevent leakage. The filtrate, and other pipe connections, to the valve, further increased the problem of preventing leakage between the valve compartments and the rotating trunnion, and increased the loss and hazard due to leakage outside the filter casing.

The foregoing and other difficulties are overcome by the use of my invention and a more efficient and more satisfactory performance obtained. In accordance with the preferred embodiment of my invention, I mount the entire filter assembly, its bearings and trunnions and filtrate valve inside the filter casing, thereby obviating the necessity of providing the trunnions with stuffing boxes, where they ordinarily pass through the casing, and overcoming the difficulty of leakage around the trunnions and the filter valve. The trunnion bearings are preferably mounted in suitable supports within the casing or on the casing wall, and thus lend themselves to ready and accurate machining and alignment within the casing. The filter valve is mounted inside the casing with the end of the trunnion bearing communicating with it, so that if leakage occurs, it will be inside the casing. Means are provided for insuring tight contact between the trunnion and the filtrate valve. Leakage is thus minimized and any leakage which occurs is within the casing, thereby removing the objection of leakage outside the casing.

In certain embodiments of the invention, the casing may be divided along a plane above its horizontal axis, whereby the bearings and the filtrate valve are all located in the lower portion of the casing, thereby making simpler and easier the assembly and disassembly of the apparatus.

My invention is applicable to both drum and disc type continuous filters, and is susceptible of various changes and modifications as will become apparent from a consideration of the accompanying drawings, forming a part of this application, in which:

Fig. 4 is a longitudinal sectional view of the apparatus, the drum being shown somewhat diagrammatically with parts omitted for the sake of clarity;

Fig. 9 is a longitudinal sectional view, similar to Fig. 4 and showing a modified form of my invention;

Fig. 11 is a longitudinal sectional view of the filter shown in Fig. 10 and taken along the line XI—XI of Fig. 10.

Figure 1:
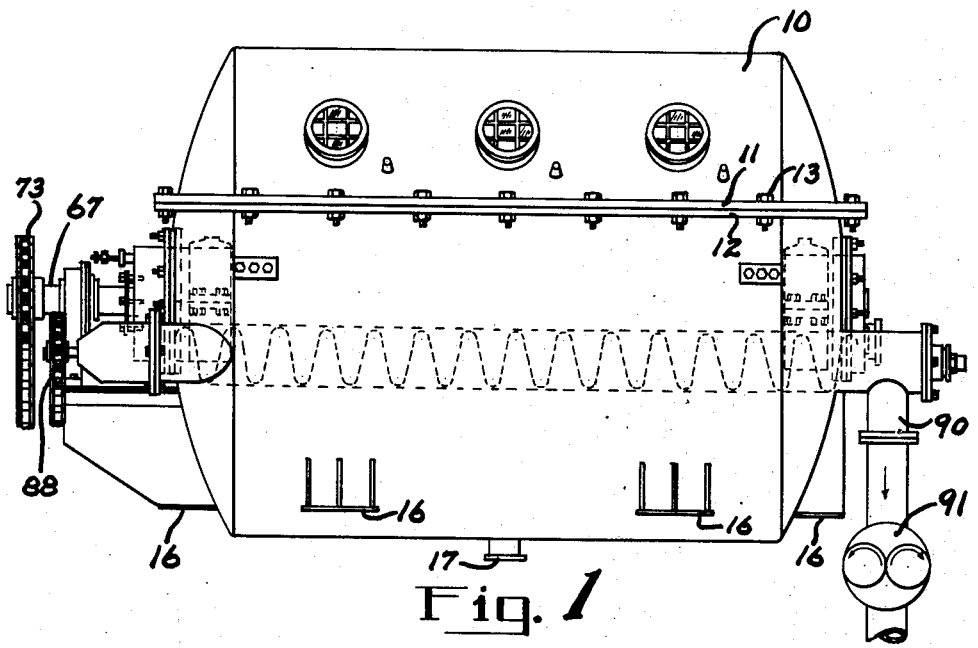
Fig. 1 is a side elevational view of one form of embodiment of the filter.
Figure 2:
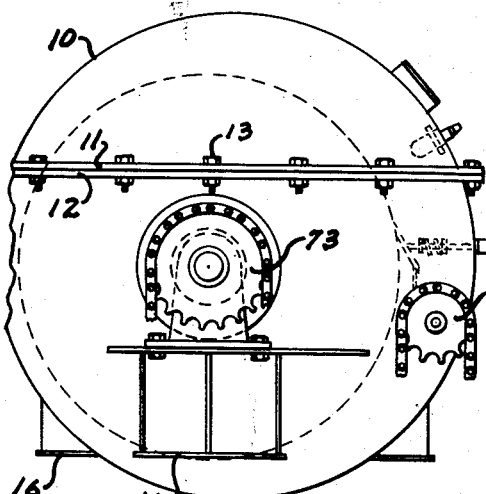
Fig. 2 is an elevational view looking toward the left hand end of Fig. 1.
Figure 3:
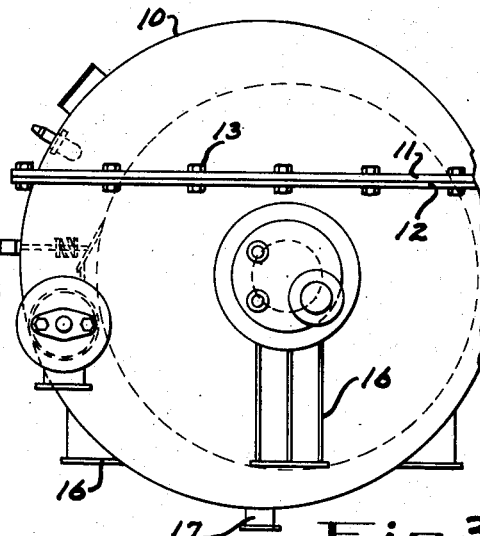
Fig. 3 is an end view opposite to that of Fig. 2.

Referring now to the drawings, particularly Figs. 1 to 5 thereof, my improved filter comprises a closed cylindrical casing 10, which may be divided, as shown, along a horizontal plane above its longitudinal axis, the upper and lower portions being flanged as shown at 11 and 12 and joined together by means of bolts 13. Suitable supporting members 16 are rigidly connected to the casing along the sides and at the ends whereby they may rest on a suitable foundation, not shown. Material to be filtered is introduced into the casing through an opening 17 in the bottom. Openings 18 and 19 are provided in the ends of the casing, below the dividing plane thereof in which openings are mounted the drive means, the filtrate valve, and the lower portions of the bearing supports, in a manner to be described later.

Mounted within the casing is a drum 21 which has closed ends and which is divided longitudinally about its periphery into segmental compartments by means of longitudinal strips 22 and 23 over which is provided a suitable filtering medium, indicated generally by the number 24. A multiplicity of filtering compartments is thus provided, to each of which is connected a plurality of pipes 26, 27, for the withdrawal of filtrate and the flushing out of the compartments in the manner well understood. For the sake of clarity, only two of such pipes are shown, it being well understood in the art that a plurality of pipes will be connected to each compartment.

Extending outwardly from the ends of the drums are hollow trunnions 28 and 29. The pipes, such as 26 and 27 from each compartment are connected into pipes 30 and 30a which terminate in a plate 32 in the end of the trunnion 29. A wear plate 31 is secured to the plate 32 by screws 35 and is provided with openings registering with the ends of the pipes 30 and 30a in the trunnion 29. The opposite end of the trunnion 28 is closed by means of a plate 33.

Figures 6, 7:
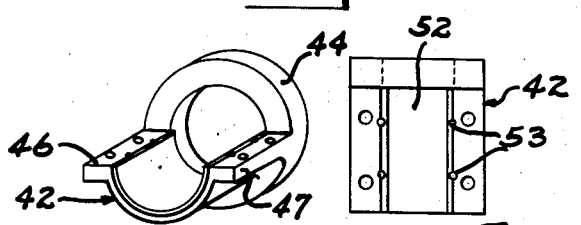
Fig. 6 is a perspective view of the lower half of one of the trunnion bearings.
Fig. 7 is a plan view of the lower half of a trunnion bearing.
Figure 8:
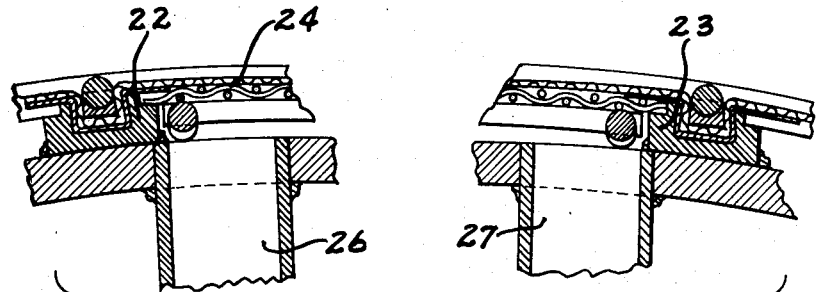
Fig. 8 is a detail sectional view showing one of the filter compartments.
Figure 5:
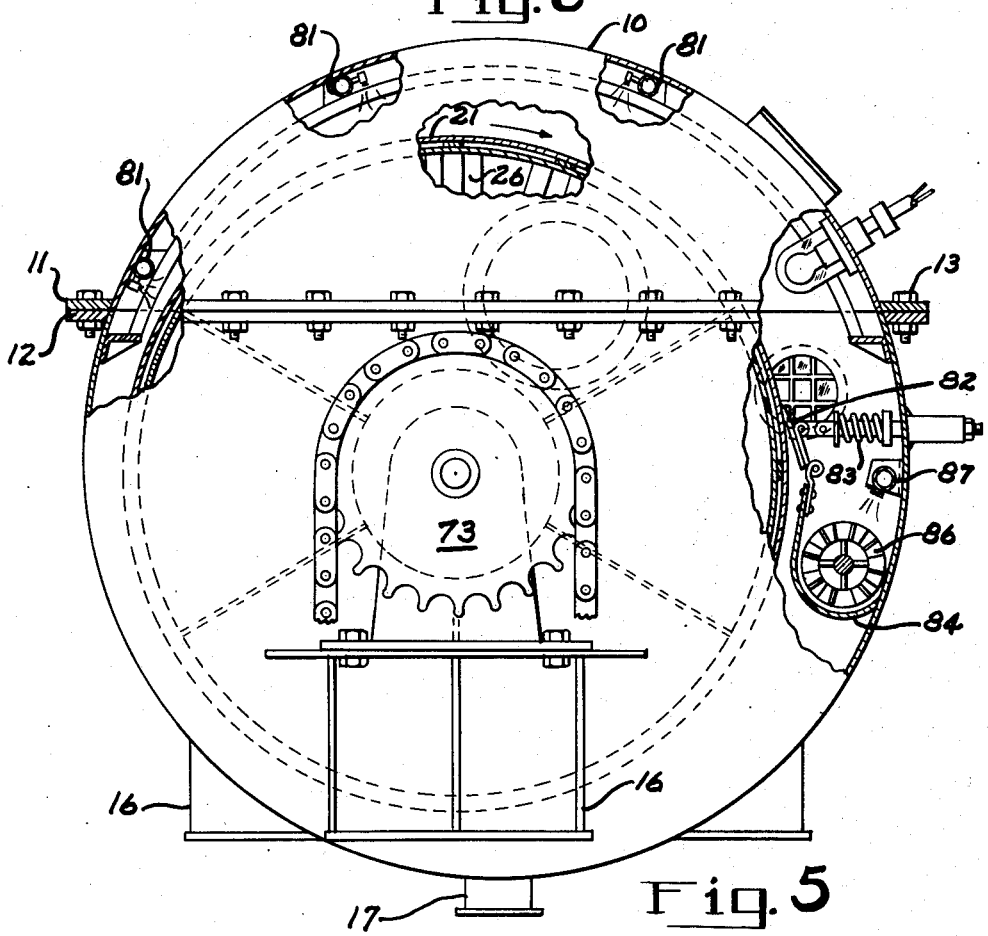
Fig. 5 is an end view of the filter with parts broken away and in section.

As shown in the drawing, Fig. 4, the casing 10 is provided with outwardly dished heads 34 and 36. The lower halves of the heads, 34a and 36a, are reinforced by means of a plurality of gussets 37 and 38, and vertical plates 39 and 41 extend across the lower part of the casing and are joined respectively to the inner edges of the gussets 37 and 38. Mounted in each of the openings 18 and 19, and supported on the plates 39 and 41, at their inner ends, are the lower halves of trunnion bearing supports 42 and 43. As shown more clearly in Fig. 6, each of said portions of trunnion bearing supports terminates at its outer end in a ring 44 which is fixedly mounted in the opening, as by welding. The lower half of the bearing support is provided with relatively thick flanges 46 and 47 and the upper halves 48 of each of the bearing supports is provided with flanges 49, indicated in dotted lines, which are joined to the flanges of the lower halves by means of studs 51. The bearings 52 are preferably renewable in their supports and are held in place in the supports by means of dowels 53 which engage partly the supports and partly the bearing half. By the arrangement just described, it will be seen that the trunnion bearings are entirely inside the outer casing and should it become necessary to remove the drum from the casing, it is only necessary that the upper portion of the casing and the upper halves of the bearing supports be removed, and drive means, later to be described, disconnected, whereupon the drum may be lifted from the casing.

Mounted on and supported from the ring 44 of the lower bearing half 43, is a filter valve 50 through which filtrate and wash is withdrawn from the various compartments of the filter assembly and the compartments are flushed in a manner well understood. The filter valve 50 is not described with particularity because it forms no part of my present invention, except as to its mounting, and support attachments. The arrangement of the ports in the valve, and the operation thereof may be such, for example, as that described in the patent to Henry M. Hunter, No. 2,174,748, dated August 29, 1944, and assigned to Goslin-Birmingham Manufacturing Company. The valve 50 is provided with an outer flange 50a which is fixedly secured to the ring 44 of the bearing 43 by means of studs 54. Filtrate, wash, air, gas, or vapor are discharged or admitted from or to the valve 50 through outlets similar to that shown at 56, as is well understood. It is well understood also that for the proper operation of the filter valve 50, the wear plate 31, on the end of the trunnion 29, must form a fluid tight engagement with the inner face of the valve, and it is necessary that the filter assembly and the valve 50 be biased or pressed toward each other in order to maintain such fluidtight engagement. In order to accomplish this purpose, I provide on the opposite end of the drum, from the filtrate valve 50, a housing 57 having a flange 58 extending therearound which is joined to the ring 44 of the bearing support 42 by means of studs 59. Inclosed within the housing 57 is an annular cylinder 61 having a piston 62 mounted therein with suitable packing 63 extending therearound, and bearing against the walls of the cylinder. At the inner end of the piston 62 is a wear plate 64 which is secured to plate 33 on the outer end of the trunnion 28. Fluid under pressure is admitted to the cylinder 61 through a pressure connection 66, whereby the piston serves to press the filter assembly towards the filtrate valve 50. The wear plate 31 is thus maintained in fluidtight engagement with the inner face of the filtrate valve 50 by reason of the pressure in the cylinder 61. Should there be any leakage between the wear plate 31 and the filter valve, it occurs within the casing where it can do no particular harm. The piston 62 is splined into the housing 57, as shown at 65, to prevent its rotation.

Extending through the center of the housing 57 is a drive shaft 67 which is splined, at its inner end, into a socket 68 formed in the outer end of the trunnion 28. A suitable bearing bushing 69 is provided in the housing 57 to support the drive shaft. The shaft is further supported by means of a bearing 71 mounted in a support 72 connected to the end of the casing. The shaft 67 is extended beyond the bearing support 72 so that any conventional drive assembly may be attached thereto as to the sprocket 73. In order to reduce friction to a minimum and to aid in maintaining a fluidtight engagement between the inner end of the piston 62 and the wear plate 64, I provide means for supplying lubricant to the engaging faces thereof. This means comprises a tube 74 which extends through the housing 57 and into the piston 62 to connect to a passage 76 therein leading to a groove 78 in the inner face of the piston. It is contemplated that a relatively heavy lubricant will be employed which acts not only to lubricate but as a packing means between the wearing faces. Similar lubricating means, not shown, may be employed between other wearing surfaces inside the casing.

The pressure on the inside and outside of the drum is equalized by means of a central opening 70 in the plates 32 and 31, which communicates with a cavity 75 in the filter valve 50. A pipe 80 connects the cavity 75 with the casing above the liquid level.

From the foregoing description of the arrangement of the casing and bearings, it will be seen that I have obviated the necessity of heavy trunnion stuffing boxes and have practically eliminated the danger of leakage outside the casing 10. While it is contemplated that the piston 62 will be in fluid tight engagement with the wear plate 64, where valuable or disagreeable fluids are employed within the casing 10, in order to insure against any possible escape thereof around the drive shaft, it may be desirable to provide a small stuffing box, or packing 79, to surround the drive shaft 67 where it emerges from the housing 57.

In operation, it is contemplated that the material to be filtered will be maintained, by any suitable means, not shown, at a suitable, constant level in the casing, the cake being formed on the filter compartments while they are submerged. The drum 21 rotates in the direction indicated by the arrow in Fig. 5. Located within the casing 10 are the usual spray pipes 81 through which is circulated a suitable washing or solvent liquid which serves to wash the cake on the filter surface as it travels with the drum. At 82 is shown a scraper for removing the cake, which is pressed against the drum by means of a spring 83 and which discharges the cake into a screw conveyor trough 84 located wholly within the casing. Preferably, the conveyor is one provided with mixed flights 86 and a spray pipe 87 may be employed to soften the cake or render it more liquid in form before it is discharged. The conveyor 86 is driven from one end by means of a sprocket 88 and terminates at its outer end in a discharge conduit 90. Where my improved filter is employed to operate at a pressure above atmospheric in the casing 10, some means must be employed in the outlet conduit to restrict the discharge of the cake whereby to maintain the pressure in the casing. I have indicated, diagrammatically, a gear pump 91 which may be used for this purpose, though any other suitable means may be employed, many of which will suggest themselves to those skilled in the art.

Referring now to Fig. 9 of the drawing wherein I show a further modified form of embodiment of my invention. Only those features which differ from those already described will be referred to in the description thereof. In accordance with this modification, it is contemplated that the drum 21a will be constructed in the same manner as that already described and be provided with trunnions 28a and 29a extending outwardly from the ends thereof, which are closed by means of plates 32a and 33a. In accordance with this modification, the trunnion bearings 92 and 93 are in the form of conventional divided sleeve bearings which are supported on cross plates 94 and 96, which in turn extend across, and are supported on, the gussets 37a and 38a, joined to the ends of the casing. The casing 10a is provided with a single end opening 97 in which is fitted a heavy ring 98. A filtrate valve 99 is provided with a peripheral flange 101 and is secured to the ring 98 by means of studs 102. I provide in this modification a wear plate 103 which is secured to the end closure 32a by means of bolts 104. A threaded socket 106 is formed in the outer face of the wear plate 103 centrally thereof to receive a drive shaft 107 which extends through the filtrate valve 99 as shown. The shaft 107 is driven by means of a worm 108 and worm gear 109 on the outer end thereof. The worm and gear just described are supported in a housing 111 which includes, and has mounted therein, an antifriction bearing 112 for the shaft 107. Pressure may be equalized between the inside and the outside of the drum, in this modification, by means of a central opening 110 in the outer end of the trunnion 28a.

In order to bias the filter assembly toward the filter valve 99, I provide a heavy spring 113 which surrounds the shaft 107 and which bears at its outer end against a collar 114 on the shaft and at its inner end against a sleeve 116 which surrounds the shaft and which bears against a thrust bearing 117 resting against the outer face of the filtrate valve 99.

Figure 10:
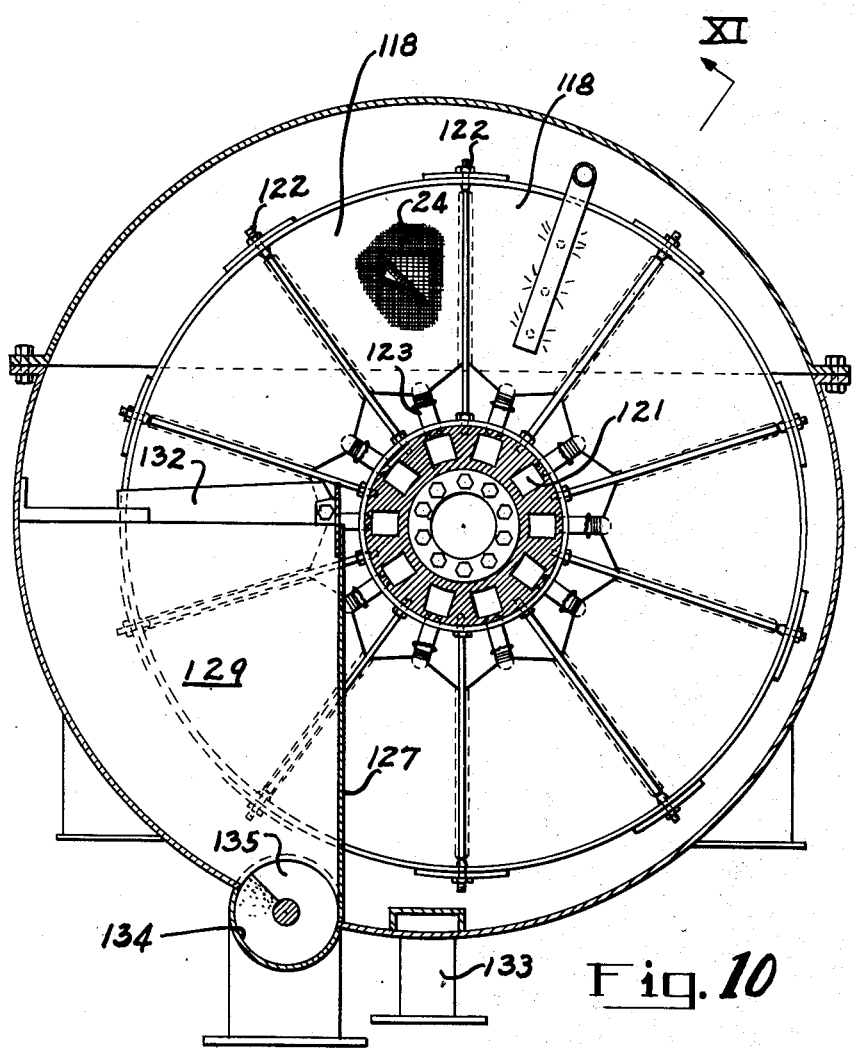
Fig. 10 is a transverse sectional view showing my invention as applied to a leaf type filter.

In Figs. 10 and 11 of the drawing, I show my invention as applied to a continuous, rotary, disc type filter. As is well understood, this type of filter embodies a plurality of discs 115, each comprising a plurality of segmental type filter sectors 118 mounted on a relatively large shaft 119 having suitable passages 121 therein for the withdrawal of filtrate. The filter sectors 118 are secured to the shaft by means of tie bolts 122 and filtrate is withdrawn from each of the sections by means of a hollow neck, or nipple 123, which communicates with its associated passage 121 in the shaft 119. The shaft 119 extends outwardly at its ends from the ends of the assembly to form trunnions 124 and 126 for the support of the assembly. The bearings, the filtrate valve, and the drive shaft, are similar to those already described in connection with Fig. 4 of the drawing, and do not require to be repeated. I show, however, a modified form of means to bias the drum toward the filtrate valve 50. In this modification, instead of introducing fluid pressure directly into the cylinder 61 to act on the annular piston 62, I place in the cylinder an expansible annular tube 120 which may be made of rubber or other suitable material. I may introduce fluid pressure into the tube through a valve 125 which passes through the outer wall of the housing. The tube 74a through which lubricant from the annular piston 62 is introduced, in this instance passes through one side of the annular cylinder 61 and communicates with a passage 76a which extends angularly through the piston 62 to communicate with the groove 78.

In accordance with this modification, the lower half of the casing is provided with longitudinal and transverse partitions which form passages through which the filtering discs move on one side of the casing. As shown, in Fig. 10, the longitudinal partition members 127 are joined at the bottom to the casing and extend upwardly to a point opposite the center of the hollow shaft 119. Transverse partition members 128 and 129 are joined to the longitudinal partition member at each of the discs and cooperate therewith to form passages 131 for the discs 115. The transverse partition members, as shown in Fig. 10, are joined to the longitudinal member 127 and at their outer edges to the casing, and extend upwardly to a point on a level with the center of the hollow shaft 119. Carried by the upper edge of each of the transverse partitions 128 and 129 is a scrapper 132 which bears against its associated disc to remove the cake therefrom. The cake falls into the pockets formed by the longitudinal transverse partitions between the passages 131 through which the discs 115 rotate.

Material to be filtered is introduced into the bottom of the casing through a conduit 133, in front of the longitudinal partition 127. The cake falling into the pockets formed by the transverse and longitudinal partitions falls into a conveyor trough 134 having therein a conveyor 135, driven from one end of the casing by means of a sprocket 136. The trough 134 is covered where it passes through the passages 131 by means of a plate 137 in each instance. The conveyor 135 is provided with right and left hand flights 135a and 135b, respectively, to move the cake discharge into the pockets toward the center where it is discharged through a conduit 139. Suitable apparatus, not shown, may be connected to the discharge outlet 139, as indicated in Fig. 11 of the drawing, for preventing loss of pressure from within the filter casing.

In all other respects, the filter shown in Figs. 10 and 11 of the drawing operates and is constructed similar to those shown in Figs. 1 to 5 of the drawing.

From the foregoing, it will be apparent that I have devised an improved filter which is applicable either to a drum of a disc type filter operating under either superatmospheric or subatmospheric pressure, and by means of which the stuffing boxes heretofore employed are eliminated, thereby eliminating leakage and decreasing the frictional load on the filter. The filtrate valve being rigidly connected to the casing provides means whereby the discharge connections to the valve do not cause misalignment, thereby greatly reducing the danger of leakage around the valve. Any leakage between the valve and the wear plate on the end of the trunnion occurs within the casing; and where noxious gases are employed, eliminates danger from that source.

In the preferred form, the lower halves of the bearing supports, being rigidly fixed to the ends of the outer casing, may be line bored for accuracy and ease of assembly and the bearings are easily renewed and repaired. Furthermore, the arrangement of the bearings and their supports renders the filter assembly easily removed from and replaced in the casing, it being necessary only to remove the upper portion of the casing and the upper halves of the bearings, and to withdraw the drive shaft 67 from the socket 68. The design further permits the forming of a shell in a cylindrical shape, thereby to withstand greater pressure and providing added strength for the casing.

It will be apparent also from the foregoing description that my invention is equally applicable to rotary filter assemblies which are not divided into a multiplicity of filter compartments, such for example, as the well known Vallez type filter.

While a closed filter casing has been illustrated, it will be obvious to those skilled in the art that an open casing may be used in filters operating under vacuum.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In a continuous rotary filter, a rotary filter assembly including a multiplicity of filter compartments, trunnions on the ends of the assembly, a cylindrical liquid receiving casing wholly inclosing the assembly including the trunnions and having an opening in each end thereof, bearings for the trunnions each including a lower half having a ring portion surrounding the adjacent opening in the casing and fixedly secured thereto so as to form an integral part thereof, an upper half for each bearing removably mounted on the lower half, means to withdraw filtrate from the compartments through the trunnion at one end of the assembly, a filtrate valve disposed to cooperate with said last mentioned trunnion and having a flange portion fixedly connected to the ring portion of the adjacent bearing, and means to urge the filter assembly bodily toward the filtrate valve and thereby hold the valve and the end of the associated trunnion in fluidtight engagement.

2. Apparatus as defined in claim 1 in which the drive shaft extends through the filtrate valve, and a spring surrounds the drive shaft and coacts between the valve and a collar provided on the drive shaft to bias the assembly toward the filtrate valve.

3. Apparatus as defined in claim 1 in which the means to hold the valve and its associated trunnion in fluidtight engagement comprises a cylinder mounted in the opening in the casing at the opposite end from the valve and closing said opening, a piston in the cylinder bearing against the trunnion at that end, and means to apply pressure to the piston.

4. Apparatus as defined in claim 3 in which an expansible annular tube is disposed within the cylinder, and in which a pressure connection extends through the housing into the tube.

5. Apparatus as defined in claim 3 in which the cylinder and piston are annular in form and in which a drive shaft for the filter assembly extends through the cylinder and piston and is operatively connected to the associated trunnion.

6. In a continuous rotary filter, a closed casing having end walls and forming a tank for the material to be filtered, a rotary filter assembly having trunnions at each end thereof, one of said trunnions having axially disposed filtrate passages therein, bearings for the trunnions fixedly mounted inside the casing, a filtrate valve embodying a body portion fixedly secured to an end wall of the casing concentric with the trunnion having the fluid passages therein, means yieldably urging the entire filter assembly toward the fixedly secured valve body portion thereby holding the filtrate-passage-containing-trunnion in endwise contact with said fixedly mounted filtrate valve body, means to rotate the filter assembly, and means to introduce material to be filtered into the casing.

7. In a continuous rotary filter, a closed casing having end walls and forming a tank for the material to be filtered, a rotary filter assembly having trunnions at each end thereof, one of said trunnions having filtrate passages therein discharging from the end thereof, bearings fixedly mounted inside the casing and supporting the trunnions for rotational and slight axial motion, a filtrate valve embodying a body portion fixedly secured to the end wall of the casing concentric with the trunnion having the fluid passages therein, means urging the rotary filter assembly bodily toward the filtrate valve and holding the end of the trunnion containing the filtrate passages yieldably in contact with said fixedly mounted filtrate valve body, means to rotate the filtrate assembly while the same is urged against the fixedly secured filtrate valve body, and means to introduce material to be filtered into the casing.

8. In a continuous rotary filter, a completely closed casing having end walls forming a tank for the material to be filtered, a rotary filter assembly having trunnions at each end thereof, one of said trunnions having axially disposed filtrate passages therein which discharge through the end of said trunnion, bearings for the trunnions fixedly mounted inside the casing, said trunnions being mounted for rotation and axial sliding movement in said bearings, a filtrate valve embodying a portion fixedly secured to the end wall of the casing facing the end of the trunnion having the filtrate passages therein, fluid pressure means located adjacent the trunnion opposite the valve and yieldably urging the entire filter assembly bodily toward the filtrate valve and holding the end of the trunnion with said passages therein against the face of the valve, means to rotate the filter assembly, and means to introduce the material to be filtered into the casing.

9. In a filter embodying a closed casing with a rotary filter assembly therein having a trunnion with filtrate passages therein discharging through the outer end of the trunnion and a fixedly mounted filtrate valve disposed at the discharge end of said trunnion and operable to withdraw filtrate from the assembly, the improvement comprising a bearing for the trunnion mounted within the filter casing, said bearing supporting the trunnion for rotation and for slight axial movement, and mechanism located at the opposite end of the filter assembly from said filtrate valve yieldably urging the entire assembly toward the filtrate valve and thereby holding the end of the trunnion in fluid tight engagement with the face of said filtrate valve.

JOHN W. LITTLE.

References Cited in the file of this patent

UNITED STATES PATENTS

| Number | Name | Date |
|---|---|---|
| 72,254 | Winants | Dec. 17, 1867 |
| 550,353 | Parker | Nov. 26, 1895 |
| 1,368,618 | Faber | Feb. 15, 1921 |
| 1,515,130 | Morrison | Nov. 11, 1924 |
| 1,558,038 | Mount | Oct. 20, 1935 |
| 2,152,900 | Manning | Apr. 4, 1939 |
| 2,167,322 | Cuno et al. | July 25, 1939 |
| 2,174,748 | Hunter | Oct. 3, 1939 |
| 2,352,330 | Lee | June 27, 1944 |
| 2,406,065 | Dickinson et al. | Aug. 20, 1946 |

FOREIGN PATENTS

| Number | Country | Date |
|---|---|---|
| 125,387 | Germany | Nov. 23, 1901 |